United States Patent
Onishi et al.

(10) Patent No.: US 11,135,795 B2
(45) Date of Patent: Oct. 5, 2021

(54) JOINING APPARATUS AND JOINING METHOD FOR A CORD PLY FOR A TIRE

(71) Applicant: SUMITOMO RUBBER INDUSTRIES, LTD., Hyogo (JP)

(72) Inventors: Kei Onishi, Hyogo (JP); Hiroshi Uchida, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 303 days.

(21) Appl. No.: 16/135,328

(22) Filed: Sep. 19, 2018

(65) Prior Publication Data

US 2019/0084258 A1    Mar. 21, 2019

(30) Foreign Application Priority Data

Sep. 20, 2017  (JP) .............................. JP2017-180515

(51) Int. Cl.
  *B29D 30/38* (2006.01)
  *B29D 30/30* (2006.01)
  (Continued)

(52) U.S. Cl.
  CPC .............. *B29D 30/38* (2013.01); *B29C 65/00* (2013.01); *B29D 30/30* (2013.01); *B29D 30/42* (2013.01);
  (Continued)

(58) Field of Classification Search
  CPC ........ B29D 30/30; B29D 30/38; B29D 30/42; B29D 2030/2685; B29D 2030/421;
  (Continued)

(56) References Cited

U.S. PATENT DOCUMENTS

2015/0336346 A1    11/2015  Neubauer et al.

FOREIGN PATENT DOCUMENTS

FR           2620073 A1  *  3/1989  ............. B29D 30/46
JP           62187020 A  *  8/1987  ......... B29C 66/4324
(Continued)

OTHER PUBLICATIONS

Toshio Azuma, JP-62187020-A, machine translation. (Year: 1987).*
Anatoly Terekhov, FR-2620073-A1, machine translation. (Year: 1989).*

*Primary Examiner* — Robert C Dye
*Assistant Examiner* — Sedef E Paquette
(74) *Attorney, Agent, or Firm* — Greenblum & Bernstein, P.L.C.

(57) ABSTRACT

Cord ply joiner for a tire includes a first pressurizer having first pressing member and first pressure receiving member in upper and lower sides, and a second pressurizer having second pressing member and second pressure receiving member in the upper and lower sides. A first code ply positioning mechanism positions a first code ply by bringing a tail end of the first code ply into contact with a side surface of the second pressure receiving member, a first code ply fixing mechanism lowers the cord end pressing member so the first cord ply is fixed, and a second code ply positioning mechanism positions the tip of the second code ply by bringing the tip into contact with a side surface of the cord end pressing member. The first pressurizer and the second pressurizer are brought close to each other, whereby a shearing force is applied to an overlapped portion.

10 Claims, 6 Drawing Sheets

(51) Int. Cl.
   *B29D 30/42* (2006.01)
   *B29C 65/00* (2006.01)
(52) U.S. Cl.
   CPC .. *B29D 2030/423* (2013.01); *B29D 2030/424* (2013.01)
(58) Field of Classification Search
   CPC ........ B29D 2030/422; B29D 2030/423; B29D 2030/424; B29D 2030/425; B29D 2030/426; B29D 2030/427; B29D 2030/428; B29C 65/00; B29C 66/1122; B29C 66/1142
   USPC .................................................. 156/117, 502
   See application file for complete search history.

(56) References Cited

FOREIGN PATENT DOCUMENTS

| | | |
|---|---|---|
| JP | 4616383 B | 1/2011 |
| JP | 2015-217683 A | 12/2015 |

\* cited by examiner

JOINING APPARATUS AND JOINING METHOD FOR A CORD PLY FOR A TIRE

TECHNICAL FIELD

The present invention relates to a joining apparatus and a joining method for a cord ply for a tire.

BACKGROUND ART

A cord ply in which a cord array body wherein cords are arranged in parallel is covered with unvulcanized rubber has a flat plate shape. Edge portions of two cord plies, specifically, the tail end portion of the preceding cord ply and the tip portion of the succeeding cord ply are overlapped and joined, and, by repeating this process, the cord ply is lengthened and used as a carcass ply of a tire or the like.

In recent years, from the viewpoint of providing a high-performance tire by reducing the rigidity difference occurring between the joint part and the other parts, it is proposed to reduce overlap amount as much as possible and to join the code plies with high accuracy (For example, Patent Documents 1 and 2, etc.).

FIGS. 10 to 14 are views for explaining a conventional method of joining cord plies for a tire. The joining apparatus has
a first pressurizing means in which a first pressing member 7, provided in the upper side, faces a first pressure receiving member 4, provided in the lower side, and
a second pressurizing means in which a second pressing member 6, provided in the upper side, faces a second pressure receiving member 3, provided in the lower side. The first pressurizing means and the second pressurizing means are arranged to face each other.

First, as shown in FIG. 10, the first cord ply 1 fed out from the joining apparatus is fed by a predetermined length and then fed back toward the joining apparatus. At the same time, the code ply tail end stopper 11 is lowered from the rear of the second pressing member 6 to a predetermined position. The tail end of the first code ply 1 is positioned by bringing the tail end of the first code ply 1 into contact with the code ply tail end stopper 11.

After the positioning is completed, as shown in FIG. 11, the cord ply tail end stopper 11 is raised and returned to the original standby position.

Thereafter, as shown in FIG. 12, the succeeding second cord ply 2 is fed until its tip comes into contact with the first pressure receiving member 4. As a result, the tip of the second code ply 2 is positioned.

Next, as shown in FIG. 13, the first pressing member 7 is lowered so as to be opposed to the first pressure receiving member 4 and the second pressing member 6 is lowered so as to be opposed to the second pressure receiving member 3. As a result, the overlapped portion between the tail end of the first code ply 1 and the tip of the second code ply 2 is crimped and jointed.

Thereafter, as shown in FIG. 14, by bringing the first pressing member and the second pressing member close to and engage with each other and by bringing the first pressure receiving member and the second pressure receiving member close to and engage with each other, a shearing force is applied to the joint portion, and then the joint operation is completed.

By repeating this process, a long cord ply can be manufactured.

PRIOR ART DOCUMENT

Patent Document

[Patent Document 1] JP-B-4616383
[Patent Document 2] JP-A-2015-217683

SUMMARY OF THE INVENTION

Problems to be Solved by the Invention

However, in the case of the above method, when the first code ply 1 comes into contact with the code ply tail end stopper 11, a slight waving phenomenon occurs in the first code ply 1 as shown in FIG. 10. Then, when the cord ply tail end stopper 11 is raised in order to feed the tip of the second code ply 2, the pressing against the tail end of the first code ply 1 disappears, and there is a possibility that the wavy first code ply 1 extends in the direction of the tail end and the position of the tail end of the first code ply 1 may be deviated.

When such a deviation occurs at the time of joint, the overlap amount between the first code ply 1 and the second code ply 2 becomes larger than the target amount. As a result, the overlap amount varies and precise joint cannot be performed.

As a method of aligning the positions of the tip and the tail end of the cord ply, there is also a method of controlling the stop position of each cord ply to be conveyed. However, since this method requires high accuracy, it may deteriorate the cycle of the joint.

Therefore, an object of the present invention is to provide a joining technology for a cord ply for a tire which enables joining with higher precision without causing a deterioration in the joint cycle at the joining of the cord plies by controlling the overlap amount.

Means for Solving the Problems

The inventors of the present invention have conducted intensive studies and have found that the above-mentioned problems can be solved by the inventions described below and have completed the present invention.

The first aspect of the present invention provides,
a joining apparatus for a cord ply for a tire
having a first pressurizing means in which a first pressing member, provided in the upper side, faces a first pressure receiving member, provided in the lower side, and a second pressurizing means in which a second pressing member, provided in the upper side, faces a second pressure receiving member, provided in the lower side, wherein the first pressurizing means and the second pressurizing means are arranged to face each other and
providing engagement claws, that can engage with each other and are provided so as to face each other, on the first pressing member and the first pressure receiving member and on the second pressing member and the second pressure receiving member; in which
the first pressing member is provided with a cord end pressing member capable of vertically moving in a direction perpendicular to the placement surface of the cord plies;
a first code ply positioning mechanism for positioning the first code ply by bringing the tail end of the first code ply into contact with a side surface of the second pressure receiving member raised to a position higher than the conveying position of the first code ply, a first code ply fixing mechanism for lowering the cord end pressing member so that the bottom surface of the cord end pressing member presses and fixes the positioned first cord ply against the upper surface of the first pressure receiving member, and a second code ply positioning mechanism for positioning the second code ply by bringing the tip of the second cord ply into contact with a side surface of the cord end pressing member pressing the first cord ply
are provided;

the first pressurizing means is configured so that the first pressing member lowers to apply a pressing force to the tail end portion of the first cord ply placed on the upper surface of the first pressure receiving member while the bottom surface of the cord end pressing member presses the first cord ply;

the second pressurizing means is configured so that the second pressing member lowers to apply a pressing force to the tip portion of the second cord ply placed on the upper surface of the second pressure receiving member; and it is configured that the first pressurizing means and the second pressurizing means are brought close to each other in a state where a pressing force is applied by the first pressurizing means and the second pressurizing means, whereby a shearing force is applied to the overlapped portion of the tail end portion of the first cord ply and the tip portion of the second cord ply.

The second aspect of the present invention is;

the joining apparatus for a cord ply for a tire according to the first aspect, wherein the cord end pressing members are arranged between the recesses of the claw portions at equal intervals in the width direction of the cord ply.

The third aspect of the present invention is;

the joining apparatus for a cord ply for a tire according to the first or second aspect, wherein the cord end pressing member is a pin bar.

The fourth aspect of the present invention is;

the joining apparatus for a cord ply for a tire according to any one of the first to third aspects, which has an overlap amount adjustment mechanism for adjusting the overlap amount between the tail end portion of the first code ply and the tip portion of the second code ply by parallel movement of the second code ply positioning mechanism in the flow direction of the cord ply.

The fifth aspect of the present invention is;

the joining apparatus for a cord ply for a tire according to any one of the first to forth aspects, wherein the engagement of the engagement claws is performed by bringing the first pressurizing means close to the second pressurizing means side.

The sixth aspect of the present invention is;

the joining apparatus for a cord ply for a tire according to any one of the first to fifth aspects, which is configured so that the lowering of the first pressing member, the upward and downward movement of the code end pressing member, and the raising of the second pressure receiving member are performed by expansion and contraction of a cylinder or an urging spring.

The seventh aspect of the present invention is;

the joining apparatus for a cord ply for a tire according to any one of the first to sixth aspects, wherein knurling is provided on an abutting surface with a cord ply of one or more of the engagement claws provided on the first pressing member, the second pressing member, the first pressure receiving member and the second pressure receiving member.

The eighth aspect of the present invention provides, a method for joining a cord ply for a tire using a joining apparatus for a cord ply for a tire according to any one of the first to seventh aspects, which has;

a member opening step of opening each of a space between the first pressing member and the second pressing member, a space between the first pressure receiving member and the second pressure receiving member, a space between the first pressing member and the first pressure receiving member and a space between the second pressing member and the second pressure receiving member;

a first code ply insertion step of inserting a tail end side of the first code ply running in reverse from the first pressurizing means side into a gap between the opened first pressing member and the first pressure receiving member;

a first code ply positioning step of positioning the tail end of the first cord ply by bringing the tail end of the inserted first cord ply into contact with the side surface of the second pressure receiving member raised to a position higher than the conveying position of the first cord ply;

a first cord placing step of placing the first cord ply whose tail end is positioned on the upper surface of the first pressure receiving member;

a first cord ply fixing step of lowering the cord end pressing member installed vertically with respect to the placement surface of the cord plies and capable of vertical movement so that the positioned first cord ply is pressed and fixed to the upper surface of the first pressure receiving member by the bottom surface of the cord end pressing member;

a second code ply inserting step of inserting the tip side of the second cord ply conveyed from the second pressurizing means side into the gap between the opened second pressing member and the second pressure receiving member;

a second code ply positioning step of positioning the tip of the second cord ply by bringing the tip of the inserted second cord ply into contact with the side surface of the cord end pressing member pressing the first cord ply;

a second cord ply placing step of placing the second cord ply whose tip is positioned on the upper surface of the second pressure receiving member;

a cord ply pressing step of applying a pressing force to the first code ply with the first pressure receiving member in a state where the first pressing member is lowered and the bottom surface of the code end pressing member presses the first code ply, and applying a pressing force to the second cord ply with the second pressure receiving member by lowering the second pressing member; and a shearing force applying step of applying a shearing force to the overlapped portion of the tail end portion of the first cord ply and the tip portion of the second cord ply by bringing the first pressurizing means and the second pressurizing means close to each other so as to engage the engagement claws in a state where a pressing force is applied by the code ply pressing step.

The ninth aspect of the present invention is, the method for joining a cord ply for a tire according to the eighth aspect wherein the overlap amount between the tail end portion of the first cord ply and the tip portion of the second cord ply in the overlapped portion is 0.5 to 10.0 mm.

The tenth aspect of the present invention is, the method for joining a cord ply for a tire according to the eighth or ninth aspect, wherein the tail end portion of the first cord ply and the tip portion of the second cord ply are joined while heating.

Effect of the Invention

According to the present invention, it is possible to provide a joining technique for a cord ply for a tire capable of joining cord plies with more precise control of the overlap amount without causing a deterioration in the joint cycle.

EMBODIMENTS FOR CARRYING OUT THE INVENTION

Figure 1:
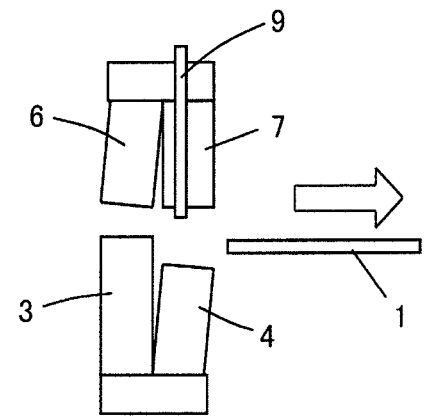
FIG. 1 is a front view illustrating a joining method of a cord ply for a tire according to an embodiment of the present invention.

Hereinafter, the present invention will be described in detail with reference to the drawings, based on embodiments.

1. Apparatus for Joining a Cord Ply for a Tire

FIGS. 1 to 6 are views for illustrating a joining method for a cord ply for a tire to be carried out using a joining apparatus for a cord ply for a tire according to the present embodiment, in which the process proceeds from FIG. 1 to FIG. 6. FIGS. 1 to 4 and FIGS. 5(a) and 6(a) are front views, and FIGS. 5(b) and 6(b) are plan views. In FIGS. 1 to 6, Reference Numerals 1 is a first cord ply, 2 is a second cord ply, 3 is a second pressure receiving member, 4 is a first pressure receiving member, 6 is a second pressing member, 7 is a first pressing member, 8 is an engagement claw, and 9 is a pin bar.

Figure 3:
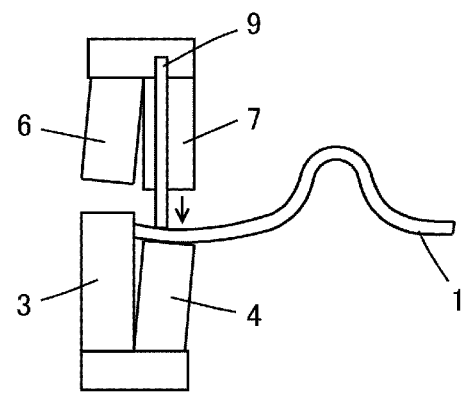
FIG. 3 is a front view illustrating a joining method of a cord ply for a tire according to an embodiment of the present invention.
Figure 4:
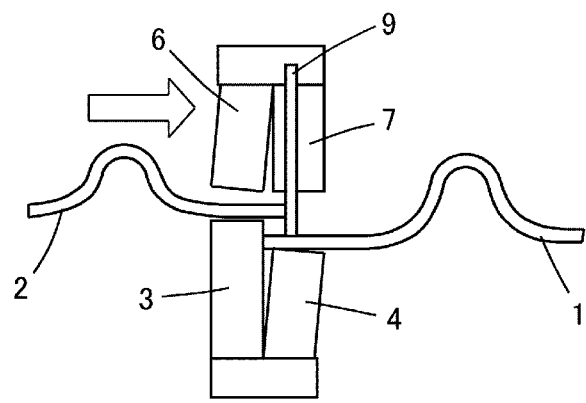
FIG. 4 is a front view illustrating a joining method of a cord ply for a tire according to an embodiment of the present invention.
Figure 5A:
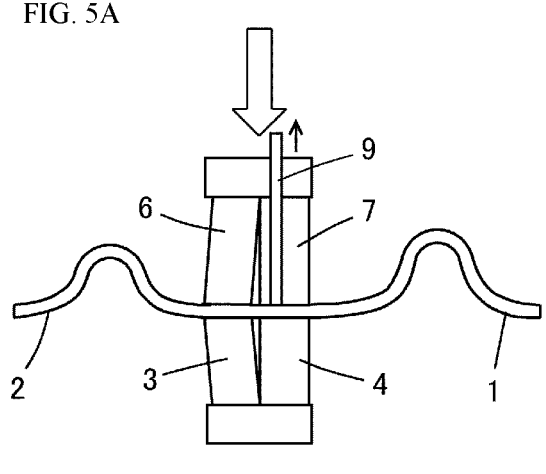
FIG. 5A illustrates is-a front view and FIG. 5B illustrates a plan view of a joining method of a cord ply for a tire according to an embodiment of the present invention.
Figure 5B:
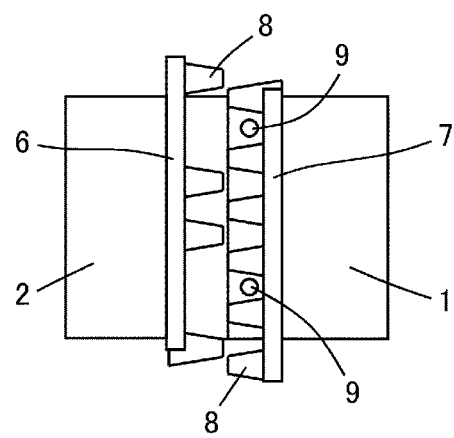
Figure 6A:
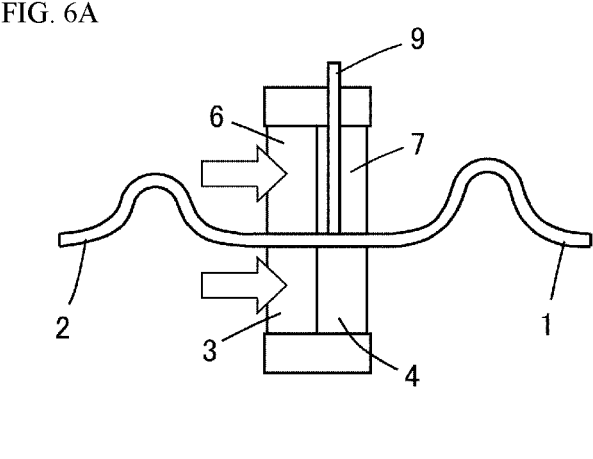
FIG. 6A illustrates a front view (a) and FIG. 6B illustrates a plan view of a joining method of a cord ply for a tire according to an embodiment of the present invention.
Figure 6B:
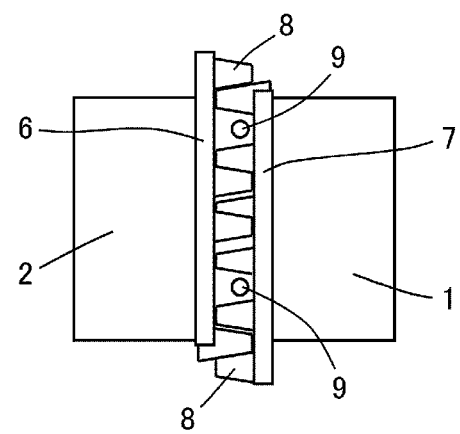

As shown in FIGS. 1 to 6, the joining apparatus for a cord ply for a tire according to the present embodiment has a first pressurizing means in which a first pressing member 7, provided in the upper side, faces a first pressure receiving member 4, provided in the lower side, and a second pressurizing means in which a second pressing member 6, provided in the upper side, faces a second pressure receiving member 3, provided in the lower side, wherein the first pressurizing means and the second pressurizing means are arranged to face each other and provides engagement claws 8, that can engage with each other and are provided so as to face each other as shown in FIG. 5(b) and FIG. 6(b), on the first pressure receiving member 4 and on the second pressure receiving member 3.

The structure mentioned above is same as the conventional joining apparatus for cord plies for tires.

However, the joining apparatus for a cord ply for a tire according to the present embodiment is greatly different, in particular, in that a pin rod 9 as a cord end pressing member capable of being moved vertically with respect to the cord ply is placed on the first pressing member 7 in place of the conventional cord ply tail end stopper.

Further, the joining apparatus for a cord ply for a tire according to the present embodiment is different from a conventional joining apparatus of a cord ply for a tire in that it has a first code ply positioning mechanism for positioning the first code ply by bringing the tail end of the first code ply into contact with a side surface of the second pressure receiving member 3 raised to a position higher than a conveying position of the first code ply 1;

a first cord ply fixing mechanism for lowering the pin rod 9 so that the bottom surface of the pin rod 9 presses and fixes the positioned first cord ply 1 against the upper surface of the first pressure receiving member 4; and a second code ply positioning mechanism for positioning the second code ply 2 by bringing the tip of the second cord ply 2 into contact with a side surface of the pin rod 9 pressing the first cord ply 1.

Then, in the present embodiment, the first pressurizing means is configurated so that the first pressing member 7 lowers to apply a pressing force to the tail end portion of the first code ply 1 positioned on the upper surface of the first pressure receiving member 4 while the pin rod 9 presses the first code ply 1.

The second pressurizing means is configurated so that the second pressing member 6 lowers to apply a pressing force to the tip portion of the second code ply 2 positioned on the upper surface of the second pressure receiving member.

It is preferable that a plurality of the pin rods 9 are provided at equal intervals on a straight line with respect to the width direction of the placing surface on which the flat cord ply is placed. The first cord ply can be more stably fixed by equally pressing the surface of the cord ply with a plurality of pin rods arranged at equal intervals in the width direction of the cord ply in a straight line. Further, by providing a plurality of pin rods, the second code ply can be more easily positioned with high accuracy. When the pin rod is disposed in the recess existing between the convex portions of the claw portion of the first pressing member, excessive processing is not required for the first pressing member, therefor preferable.

Figure 7A:
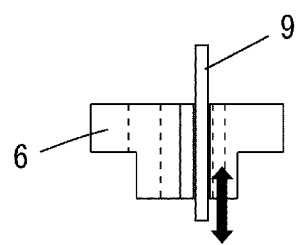
FIG. 7A is a side view showing a pin bar provided between the claws of the first pressing member.
Figure 7B:
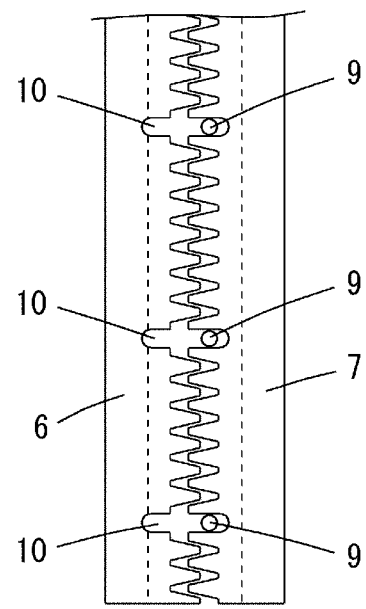
FIG. 7B is a plan view showing how claws in the joining apparatus are arranged.

FIG. 7(a) is a side view showing a state where the pin rod is disposed on the claw portion of the first pressing member, and FIG. 7(b) is a plan view showing the arrangement state of the claw portion in the joining apparatus.

The pin rod 9 is provided in a recess between the convex portions of the claw portion in a direction perpendicular to the tail end face of the first code ply 1, and movement in the vertical direction indicated by an arrow is possible, as shown in FIG. 7(a). As shown in FIG. 7(b), the pin rod 9 has a circular cross section and is disposed in a groove portion formed at equal intervals (every eighth in the figure) in the claw portion. By disposing the pin rod 9 at equal intervals in this way, it is possible to uniformly press and fix the tail end portion of the cord ply. Similarly, a groove 10 is also provided at a position facing the groove portion of the claw portion on which the pin rod 9 of the second pressing member 6 is provided.

Further, in the present embodiment, it is configurated that the first pressurizing means and the second pressurizing means are brought close to each other so that the claws are engaged with each other, whereby a shear force is applied to the overlapped portion of the tail end portion of the first code ply 1 and the tip portion of the second code ply 2.

In the above-described embodiment, the engagement of the engagement claws is performed, for example, by bringing the first pressurizing means close to the second pressurizing means.

The lowering of the first pressing member 7, the vertical movement of the pin rod 9, and the raising of the second pressure receiving member 3 are preferably performed by expansion and contraction of a cylinder and an urging spring.

Further, in the present embodiment, it is preferable to provide an overlap amount adjusting mechanism in which the second code ply positioning mechanism moves parallel to the flow direction of the cord ply, so that the overlap amount between the tail end portion of the first code ply and the tip portion of the second code ply is adjusted. By this mechanism, the overlap amount in the overlapped portion of the two cord plies can be adjusted freely.

In the present embodiment, it is preferable that an abutting surface, to cord ply, of one or more of engagement claws among the respective engagement claws provided on the first pressing member 7, the second pressing member 6, the first pressure receiving member 4, and the second pressure receiving member 3, and the bottom of the pin rod 9 are knurled so that the cord ply placed thereon can be stably held and joined.

A metal member having high hardness is preferable for each pressing member, pin rod and pressure receiving member. Specifically, a metal having a Vickers hardness (Hv) of 200 or more, for example, an iron member having an S45C or more is preferable.

The size of each claw in each of the engagement claws 8 is preferably such that the width of the bottom portion is 5 to 15 mm, the width of the tip portion is 40 to 100% of the width of the bottom portion, and the height is 100 to 150% of the width of the bottom portion. When the width of the bottom portion exceeds 15 mm, it becomes difficult to achieve uniform engagement, and local engagement failure may occur. In addition, if it is smaller than 5 mm, since the number of claws increases, it becomes difficult to perform the cutting process for producing the engagement claw 8, and the processing cost increases.

In this embodiment, the shape of the pin rod is a thin bar shape. Although the cross sectional shape of the bottom of the pin rod is not particularly limited, the circular shape as shown in FIG. 7 is preferable. Also, it is preferable that the cross section is a plane perpendicular to the center axis of the pin rod. The thickness is not limited as long as it can be arranged in the groove portion between the convex portions of the claw portion, but in the case of the circular shape, usually, 5 to 15 mm is preferable according to the size of the claw.

2. Joining Method for a Cord Ply for a Tire

Next, joining method for a cord ply for a tire to be carried out using a joining apparatus for a cord ply for a tire having the above-described structure will be described. In the present embodiment, the process proceeds from FIG. 1 to FIG. 6. Each step will be described below. The shapes of the first cord ply and the second cord ply are flat plates, and in FIGS. 1 to 6, the left and right are longitudinal directions, and the top and bottom are thickness directions.

(1) Member Opening Step

Prior to joining the cord plies, each of the space between the first pressing member 7 and the second pressing member 6, the space between the first pressure receiving member 4 and the second pressure receiving member 3, the space between the first pressing member 7 and the first pressure receiving member 4, and the space between the second pressing member 6 and the second pressure receiving member 3 is opened.

FIG. 1 shows a state after each member is opened and the first code ply 1 has been fed out from the joining apparatus for a cord ply for a tire. The first code ply 1 is conveyed to a position separated by a predetermined distance and stopped, after being fed out from the joining apparatus for a cord ply for a tire in the direction of the thick arrow.

(2) First Cord Ply Insertion Step

Next, the stopped first code ply 1 is reversely fed from the side of the first pressurizing means, and the tail end side of the first code ply 1 is inserted into the gap between the opened first pressing member 7 and the first pressure receiving member 4.

(3) First Code Ply Positioning Step

Figure 2:
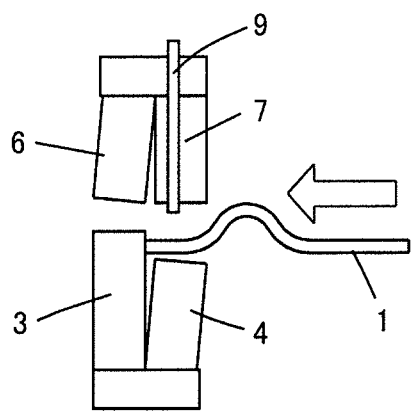
FIG. 2 is a front view illustrating a joining method of a cord ply for a tire according to an embodiment of the present invention.

When the tail end of the inserted first cord ply 1 comes into contact with the side surface of the second pressure receiving member 3 raised to a position higher than the conveying position of the first code ply as shown in FIG. 2, the conveyance of the first code ply 1 is stopped at that point. Thereby, the tail end of the first code ply 1 is positioned at a predetermined position. At this moment, the first cord ply 1 is in a waving state.

(4) First Code Ply Placing Step

Next, the first cord ply where the tail end is positioned is placed on the upper surface of the first pressure receiving member.

(5) First Cord Ply Fixing Step

Next, as shown in FIG. 3, the vertically movable pin rod 9 which is installed vertically with respect to the placement surface of the cord ply and is disposed in the recess of the claw portion is lowered, and the bottom of the pin rod 9 presses the first code ply 1 lightly downward. Thereby, the tail end portion of the first code ply 1 can be fixed on the first pressure receiving member 4. At this time, the tail end of the first cord ply 1 is at a position protruding from the first pressure receiving member 4, and this protruding portion forms an overlapped portion.

(6) Second Cord Ply Insertion Step

Next, in a state where the tail end portion of the first cord ply 1 is placed on the first pressure receiving member 4, the tip portion of the second cord ply 2 which is conveyed from the side of the second pressurizing means is inserted into the gap between the opened second pressing member 6 and the second pressure receiving member 3, as shown in FIG. 4.

(7) Second Cord Ply Positioning Step

As shown in FIG. 4, when the tip of the inserted second code ply 2 comes into contact with the side surface of the pin rod 9 pressing the first code ply 1, the conveyance of the second code ply 2 is stopped. Since a plurality of pin rods 9 are installed at equal intervals on a straight line in the width direction of the code ply placement surface, at this step, the pin rods 9 form a lattice extending from the lower surface of the first pressing member to the first code ply, so that the second code ply can be easily brought into contact and positioned with high accuracy. At this moment, the second cord ply 2 also becomes wavy with the momentum of contact.

(8) Second Cord Ply Placing Step

Thereafter, by slightly lowering the second pressing member 6 and slightly pressing the second code ply 2 downward, the tip portion of the second code ply 2 is placed on the second pressure receiving member 3. At this time, the tip of the second cord ply 2 is at a position protruding from the second pressure receiving member 3, and the protruding portion forms an overlapped portion.

(9) Code Ply Pressing Step

Next, while pressing the first cord ply with the bottom surface of the pin rod 9, the first pressing member 7 is lowered to apply a pressing force to the first code ply 1 with the first pressure receiving member 4, and the second pressing member 6 is lowered to apply a pressing force to the second code ply 2 with the second pressure receiving member 3; and press is performed so that the mating face of the first pressing member 7 and the pressure receiving member 4 and the mating face of the second pressing member 6 and the second pressure receiving member 3 are flush with each other, as shown in FIG. 5(*a*). At this time, as shown in FIG. 5(*b*), the engagement claws 8 of the first pressurizing means and the second pressurizing means are not yet engaged with each other.

(10) Shearing Force Applying Step

Next, as shown in FIG. 6, in a state where a pressing force is applied by the above-described code ply pressing step, the first pressurizing means and the second pressurizing means are brought close to each other so as to engage the engagement claws 8. As a result, the opened first pressing member 7 and the second pressing member 6 and the first pressure receiving member 4 and the second pressure receiving member 3 are closed, and a lateral shear force is applied to the overlapped portion formed in the gap between the first pressurizing means and the second pressurizing means; and the first cord ply 1 and the second cord ply 2 are joined.

At this time, the overlap amount in the overlapped portion is preferably 0.5 to 10.0 mm. If the amount is smaller than 0.5 mm, the overlapped portion may be separated in the subsequent process. On the other hand, if it exceeds 10.0 mm, the cord density in the overlapped portion becomes high, which may cause a decrease in uniformity in a tire.

In the present embodiment, since the tail end portion of the first cord ply is fixed by the pin rod and overlaps with the tip portion of the second cord ply, the overlap amount is easily controlled with high precision and the positioning cycle is not deteriorated.

If this joining is performed while heating, the rubber of the cord ply softens and the pressing force and the shearing force act more effectively at the time of joining the cord plies. As a result, it is possible to further integrate and achieve stronger joining. The preferred heating temperature is 60 to 120° C.

3. Effects of the Present Embodiment

In case of joining the cord plies using the joining apparatus for a cord ply for a tire according to the present embodiment, when forming the overlapped portion, the position of the tip of the second code ply 2 is positioned by the side surface of the pin rod 9, in a state where the position of the tail end of the first cord ply 1 is positioned by the side surface of the second pressure receiving member 3 and fixed by the pin rod 9.

Therefore, the tail end of the first cord ply and the tip of the second cord ply are positioned without being released until the pressing (pressing step) by the first pressurizing means and the second pressurizing means is performed.

In the present embodiment, since the first pressurizing means and the second pressurizing means are brought close to each other in a state where the overlap amount is controlled with high precision, and a shearing force is applied to the overlapped portion and joining is performed (shearing force applying step), there is no variation in the overlap amount in the overlapped portion between the tail end portion of the first cord ply and the tip portion of the second cord ply. By controlling the overlap amount with high accuracy, the cord plies joined with high accuracy with small variations in the overlap amount can be provided, with a short joint cycle.

EXAMPLE

Hereinafter, the present invention will be described more specifically based on Examples and Comparative Examples.

1. Manufacture of Cord Ply (1) Example

Placing PET of 1670 dtex/2 as a warp at 50 ends/5 cm, a cord ply having a thickness of 1.00 mm and a width of 600 mm was prepared. Then, joining the cord ply was performed 40 times by using a joining apparatus according to the present embodiment, as described above, and the overlap amount of the overlapped portion is adjusted to 3.0 mm to manufacture the cord ply of the example.

(2) Comparative Example

A cord ply of the comparative example was manufactured in the same manner as in the example except that a joining apparatus for a tire cord ply using a conventional cord ply tail end stopper was used.

2. Evaluation

The overlap amounts of the overlapped portions at 40 joining positions of the cord plies obtained in the examples and the comparative example were actually measured, and the average and the standard deviation thereof were calculated.

Figure 8:
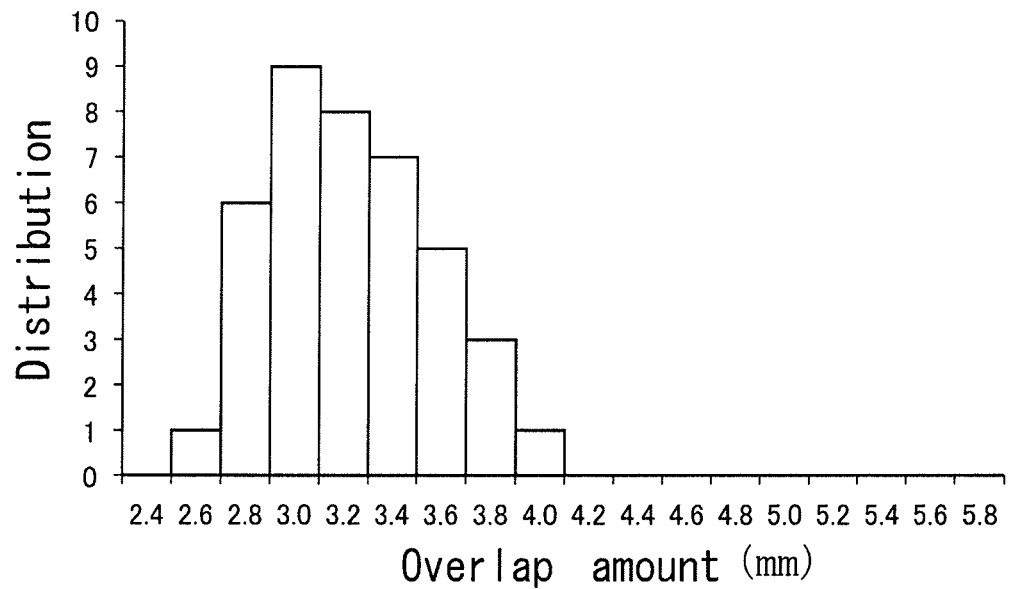
FIG. 8 is a graph showing the distribution of the overlap amount of cord plies when the cord plies are joined using a joining method of a cord ply for a tire according to the present invention.
Figure 9:
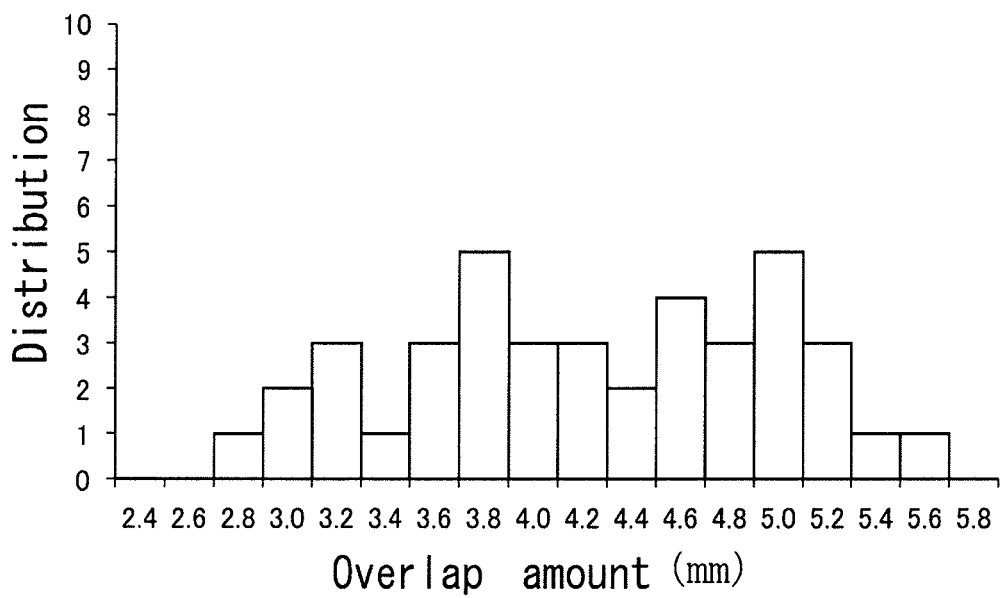
FIG. 9 is a graph showing the distribution of the overlap amount of cord plies when the cord plies are joined using a conventional joining method of a cord ply for a tire.
Figure 10:
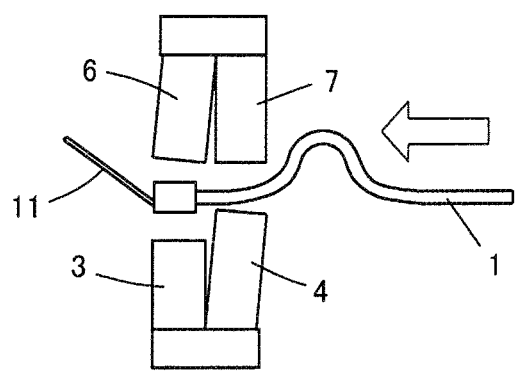
FIG. 10 is a view illustrating a conventional joining method of a cord ply for a tire.
Figure 11:
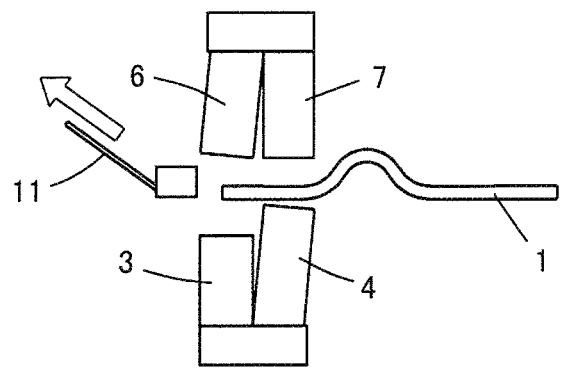
FIG. 11 is a view illustrating a conventional joining method of a cord ply for a tire.
Figure 12:
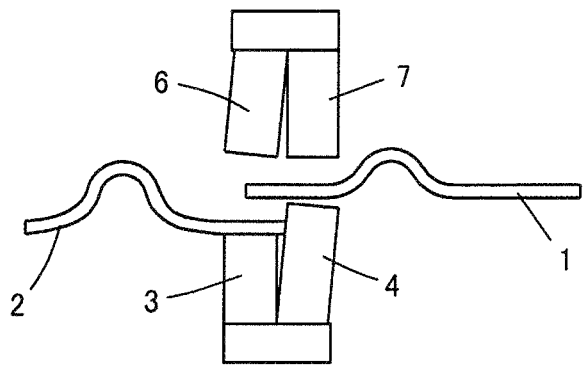
FIG. 12 is a view illustrating a conventional joining method of a cord ply for a tire.
Figure 13:
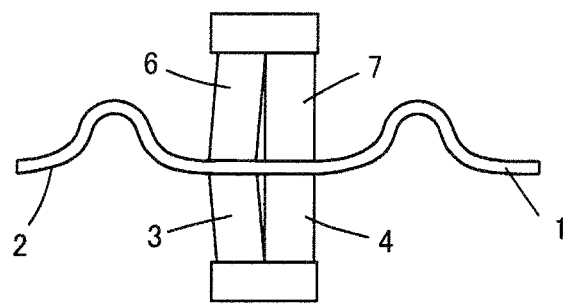
FIG. 13 is a view illustrating a conventional joining method of a cord ply for a tire.
Figure 14:
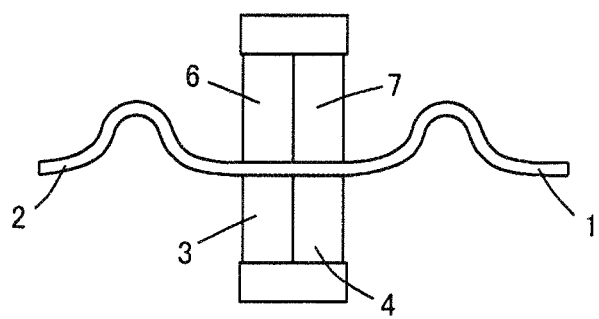
FIG. 14 is a view illustrating a conventional joining method of a cord ply for a tire.

The results are shown in Table 1 and the distribution of measured values is shown in FIG. 8 (Example) and FIG. 9 (Comparative Example).

TABLE 1

|  | Target value | Average value | Standard deviation |
| --- | --- | --- | --- |
| Example | 3.0 mm | 3.23 mm | 0.338 mm |
| Comparative Example | 3.0 mm | 4.23 mm | 0.748 mm |

It can be seen from FIGS. 8 and 9 that, in the comparative example, the measurement results are widely dispersed from 2.8 to 5.6 mm, whereas, in the example, the measurement results are within the narrow range of 2.6 to 4.0 mm.

It can be seen from Table 1 that, in the example, the average value is 3.23 mm and close to the target value while, in the comparative example, it is 4.23 mm which is far away from the target value. In addition, the standard deviation is 0.338 mm in the example, which is less than half of 0.748 mm in the comparative example, and it can be seen that, in the example, the bonding with high accuracy is achieved.

Although the present invention has been described based on the embodiments, the present invention is not limited to the above described embodiments. Various modifications can be made to the above embodiment within the same and equivalent scope as the present invention.

DESCRIPTION OF THE REFERENCE NUMERALS

1 First Code Ply
2 Second code ply
3 Second pressure receiving member
4 First pressure receiving member
6 Second pressing member
7 First pressing member
8 Engagement claw
9 Pin bar (Cord end pressing member)
10 Groove
11 Code ply tail end stopper

What is claimed is:

1. A joining apparatus for a cord ply for a tire, comprising:
    a first pressurizer in which a first press, provided in an upper side, faces a first pressure receiver, provided in a lower side;
    a second pressurizer in which a second press, provided in the upper side, faces a second pressure receiver, provided in the lower side, wherein the first pressurizer and the second pressurizer are arranged to face each other; and
    engagement claws that can engage with each other and are provided so as to face each other, provided on the first press and the first pressure receiver and on the second press and the second pressure receiver; wherein:
    the first press comprises a cord end press capable of vertically moving in a direction perpendicular to a placement surface of a first cord ply,
    a first cord ply positioner that positions the first cord ply by bringing a tail end of the first cord ply into contact with a side surface of the second pressure receiver raised to a position higher than a conveying position of the first cord ply is provided,
    a first cord ply fixator that lowers the cord end press so that a bottom surface of the cord end press presses and fixes the positioned first cord ply against an upper surface of the first pressure receiver is provided, and
    a second cord ply positioner that positions a second cord ply by bringing a tip of the second cord ply into contact with a side surface of the cord end press pressing the first cord ply is provided,
    the first pressurizer is configured so that, the first press lowers to apply a pressing force to the tail end of the first cord ply placed on the upper surface of the first pressure receiver while the bottom surface of the cord end press presses the first cord ply,
    the second pressurizer is configured so that the second press lowers to apply a pressing force to the tip of the second cord ply placed on an upper surface of the second pressure receiver, and
    the first pressurizer and the second pressurizer are brought close to each other in a flow direction of the cord ply in a state where the u pressing force to the tail end of the first cord ply and the pressing force to the tip of the second cord ply are respectively applied by the first pressurizer and the second pressurizer, whereupon a shearing force is applied to an overlapped portion of the tail end of the first cord ply and the tip of the second cord ply.

2. The joining apparatus for the cord ply for the tire according to claim 1, wherein the cord end press includes cord end presses that are arranged between recesses of the engagement claws at equal intervals in a width direction of the cord ply.

3. The joining apparatus for the cord ply for the tire according to claim 1, wherein the cord end press is a pin bar.

4. The joining apparatus for the cord ply for the tire according to claim 1, further comprising an overlap amount adjuster that adjusts an overlap amount between the tail end of the first cord ply and the tip of the second cord ply by parallel movement of the second cord ply positioner in a flow direction of the cord ply.

5. The joining apparatus for the cord ply for the tire according to claim 1, wherein the engagement of the engagement claws is performed by bringing the first pressurizer close to a side of the second pressurizer.

6. The joining apparatus for the cord ply for the tire according to claim 1, wherein the lowering of the first press, the upward and downward movement of the cord end press, and the raising of the second pressure receiver are performed by expansion and contraction of one of a cylinder or an urging spring.

7. The joining apparatus for the cord ply for the tire according to claim 1, wherein knurling is provided on an abutting surface, which is to abut with a respective one of the first cord ply and the second cord ply, of one or more of the engagement claws provided on the first press, the second press, the first pressure receiver, and the second pressure receiver.

8. A method for joining a cord ply for a tire using the joining apparatus for the cord ply for the tire according to claim 1, the method comprising:
    opening each of a space between the first press and the second press, a space between the first pressure receiver and the second pressure receiver, a space between the first press and the first pressure receiver and a space between the second press and the second pressure receiver;
    inserting a tail end side of the first cord ply running in reverse from a side of the first pressurizer into a gap between the opened first press and the first pressure receiver;
    positioning the tail end of the first cord ply by bringing the tail end of the inserted first cord ply into contact with the side surface of the second pressure receiver raised to a position higher than the conveying position of the first cord ply;
    placing the first cord ply whose tail end is positioned on the upper surface of the first pressure receiver;
    lowering the cord end press installed vertically with respect to the placement surface of the first cord ply and capable of vertical movement so that the positioned first cord ply is pressed and fixed to the upper surface of the first pressure receiver by the bottom surface of the cord end press;
    inserting a tip side of the second cord ply conveyed from a side of the second pressurizer into the gap between the opened second press and the second pressure receiver;
    positioning the tip of the second cord ply by bringing the tip of the inserted second cord ply into contact with the side surface of the cord end pressing member pressing the first cord ply;

placing the second cord ply whose tip is positioned on the upper surface of the second pressure receiver;

applying a pressing force to the first cord ply with the first pressure receiver in a state where the first press is lowered and the bottom surface of the cord end press presses the first cord ply, and applying a pressing force to the second cord ply with the second pressure receiver by lowering the second press; and applying a shearing force to the overlapped portion of the tail end of the first cord ply and the tip of the second cord ply by bringing the first pressurizer and the second pressurizer close to each other so as to engage the engagement claws in a state where the pressing force is applied in the applying of the pressing force.

9. The method for joining the cord ply for the tire according to claim 8, wherein an overlap amount between the tail end of the first cord ply and the tip of the second cord ply in the overlapped portion is 0.5 to 10.0 mm.

10. The method for joining the cord ply for the tire according to claim 8, further comprising joining the tail end of the first cord ply and the tip of the second cord ply while heating.

\* \* \* \* \*